Nov. 1, 1966 A. ASHMELE ET AL 3,282,590

SOUND REPRODUCING APPARATUS

Filed Nov. 4, 1964

2 Sheets-Sheet 1

Inventors
Anton Ashmele by Michael J. Striker
Atty

Inventors
Anton Ashmele

By Michael J. Striker
Atty.

United States Patent Office 3,282,590

Patented Nov. 1, 1966

3,282,590
SOUND REPRODUCING APPARATUS

Anton Ashmele, Trossingen, Wurttemberg, Germany, assignor to Trossinger Metallstimmenfabrik Hans Eisen, Trossingen, Wurttemberg, Germany Filed Nov. 4, 1964, Ser. No. 409,000
Claims priority, application Germany, Nov. 5, 1963, T 25,013
14 Claims. (Cl. 274—1)

The present invention relates to sound reproducing apparatus in general, and more particularly to a sound reproducing apparatus of the type wherein a rotary disk-shaped record carrier is driven by a motor including a spring which can be rewound or retensioned by a flexible element. Still more particularly, the invention relates to improvements in the construction of sound reproducing apparatus which may be used in toy devices and wherein the record carrier is provided with a series of independent sound grooves so that, in response to repeated rewinding of the spring, the apparatus will reproduce differeent sounds or different series of sounds. The sound reproducing apparatus of the present invention constitutes an improvement over and a further development of the sound reproducing apparatus which is disclosed in the copending application Serial No. 297,798 of Anton Ashmele.

It is an important object of the present invention to provide the sound reproducing apparatus with an improved stop device which enables the stylus to move into accurate registry with the end convolutions of consecutive sound grooves in response to repeated rewinding of the spring which rotates the record carrier so that the apparatus will automatically reproduce sounds in a desired sequence.

Another object of the invention is to provide a stop device which may be actuated in a fully automatic way in response to rewinding of the spring which serves to drive the record carrier.

A further object of the invention is to provide a stop device which is of very simple and rugged construction so that it may be used in sound reproducing apparatus for talking dolls, musical dolls and similar toy devices, which is fully concealed from view so that it cannot be damaged or destroyed by children playing with a talking doll or another toy device in which the improved sound reproducing apparatus is put to use, and which can be constructed in such a way that it may arrest the stylus in any desired number of different starting positions, depending on the number of independent sound grooves in the record carrier.

A concomitant object of the invention is to provide an improved tone arm which may be used in connection with a stop device of the above outlined characteristics and which is capable of cooperating with the stop device to arrest the stylus in different starting positions, always with such accuracy that the grooved side of the record carrier is not damaged when the stylus is permitted to enter a selected sound groove.

A further object of the invention is to provide an improved motion transmitting arrangement which may be utilized to operate the stop device in response to rewinding of the spring which drives the record carrier.

Still another object of the invention is to provide a very simple sound reproducing apparatus which embodies a tone arm, a stop device and a motion transmitting arrangement of the above outlined characteristics.

Briefly stated, one feature of my invention resides in the provision of sound reproducing apparatus which comprises a rotary record carrier disk having an exposed side provided with a series of independent concentric helical sound grooves each including an outer convolution and an inner convolution respectively located at a first and second distance from the periphery of the disk, a rewindable spring for rotating the disk, a device for winding the spring including a flexible element which is stretched when the spring is held against unwinding and which is slack when the spring unwinds to rotate the disk, a tone arm including a stylus which overlies the disk and is movable by the tone arm between a series of starting positions and a series of second positions respectively located at a first and second distance from the periphery of the disk so that the stylus registers with the outer convolution of a different sound groove in each starting position of the tone arm and with the inner convolution of the respective sound groove in each second position of the tone arm, means for normally maintaining the stylus in engagement with the disk so that the stylus is compelled to track a sound groove and to move from one of its starting positions to the respective second position when the spring unwinds to rotate the disk, means for automatically returning the tone arm to one of its starting positions when the stylus is disengaged from the disk, and an adjustable stop device for arresting the tone arm in one of its starting positions. The flexible element of the winding device preferably also serves to move the stylus away from the disk when the spring is being rewound so that the tone arm is then free to return to one of its starting positions.

In accordance with the present invention, the stop device includes a rotary arresting member which is installed in the path of the tone arm and which is provided with a series of stop faces each located at a different distance from the axis of the arresting member and each adapted to be engaged by the tone arm in a given angular position of the arresting member, and a motion transmitting assembly including a reciprocable member which is caused by the flexible element to perform working strokes and to thereby rotate the arresting member in response to a pull on the flexible element so that the angular position of the arresting member is changed automatically whenever the operator decides to rewind the spring. Consequently, the stop faces of the arresting member will arrest and locate the tone arm in different starting positions so that the stylus may begin to track a different sound groove as soon as the spring is free to unwind.

The novel features which are considered as characteristic of the invention are set forth in particular in the appended claims. The improved sound reproducing apparatus itself, however, both as to its construction and its mode of operation, together with additional features and advantages thereof, will be best understood upon perusal of the following detailed description of certain specific embodiments with reference to the accompanying drawings, in which:

Figure 1:
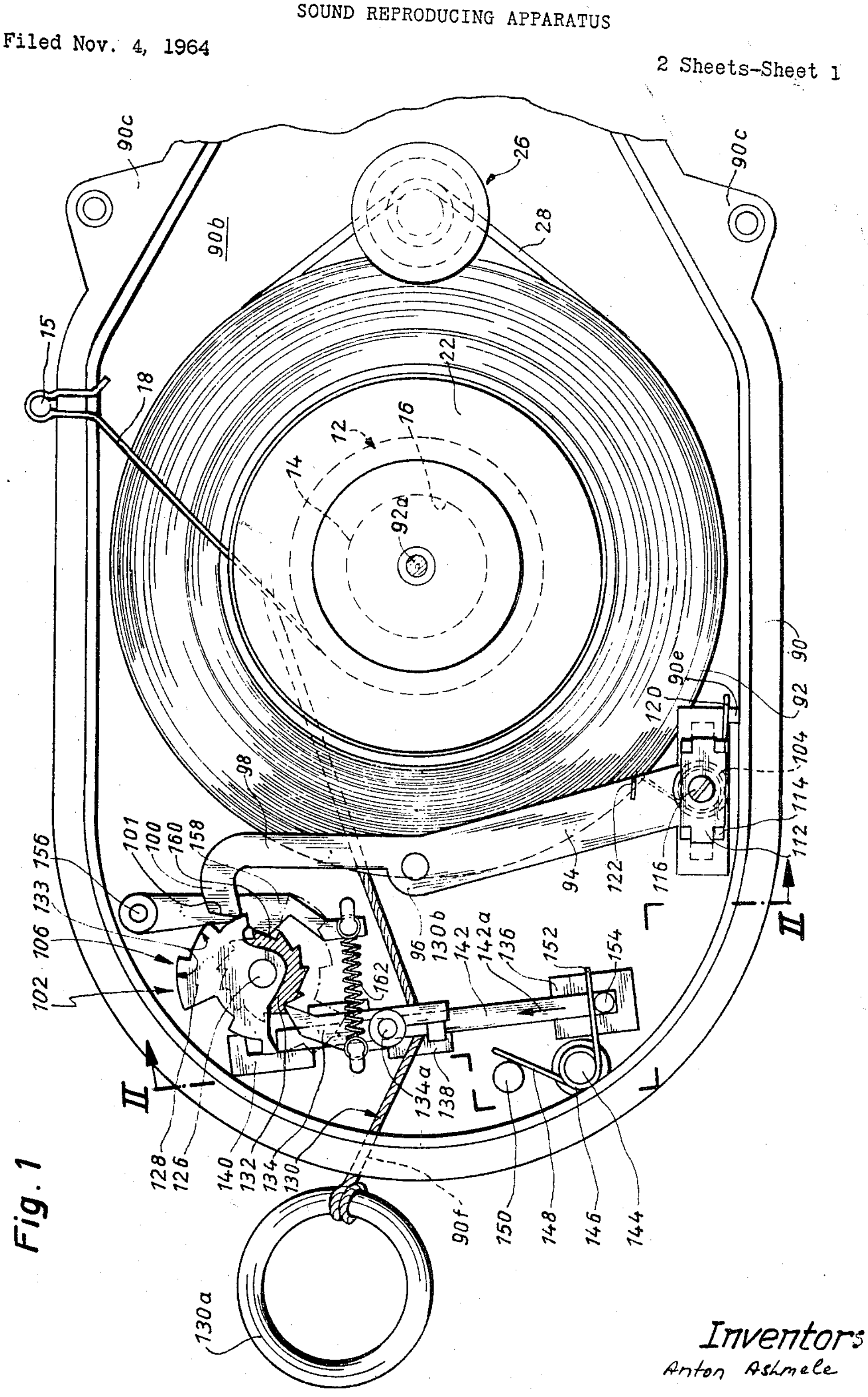
FIG. 1 is a fragmentary top plan view of a sound reproducing apparatus which embodies my invention, the cover of the housing being removed to reveal the component parts of the sound reproducing mechanism and the improved stop device.

Referring to the drawings, and first to FIGS. 1 and 2, there is shown a sound reproducing apparatus, hereinafter called phonograph or toy phonograph, which comprises a metallic or plastic housing including a first section or base 90 and a second section or cover 90*a*. The housing defines an internal chamber 90*b* which accommodates the sound reproducing mechanism, the stop device and a record carrier 92 here shown as a disk mounted on a turntable whose shaft 92a is supported by the base 90. The periphery of the turntable is provided with a groove (not shown) for an endless belt 28 which forms part of a speed regulator and serves to drive a centrifugal governor 26 shown in FIG. 1. The base 90 comprises lugs 90c by means of which the phonograph may be detachably or permanently mounted in the torso, head or another body portion of a toy device, such as a talking doll, a musical toy with moving parts or the like not shown. It is clear that the phonograph is equally useful in toy trains, ships, cranes, aircraft or other types of toy devices which are smaller-scale replicas of various machines or other structures.

The upper side of the turntable for the disk 92 is adjacent to a concentric drum 14 whose central portion (not shown) is connected with the shaft 92a and with one end portion of a rewindable torsion spring 18. The other end portion of this spring is anchored in the base 90, e.g., by means of a removable pin 15, in such a way that it may be readily separated from the housing. The spring 18 forms part of a motor 12 for the turntable and stores energy when it is convoluted around the axis of the drum 14 by a winding mechanism including a reel 22 which is concentrically fixed to the drum and whose core is connected with one end of a flexible element, such as a cord or string 130, this cord extending through a suitable aperture 90f in the base 90 and having its outer end connected with a handgrip member here shown as an eye 130a. The spring 18 is tensioned in response to a pull exerted on the cord 130 in a sense to rotate the reel 22 in a counterclockwise direction, as viewed in FIG. 1. The connection between the shaft 92a and the turntable for the disk 92 comprises a free-wheel or one-way clutch 16 which enables the shaft 92a to rotate with the drum 14 and with the reel 22 without driving the turntable and the disk 92 when the operator tensions the spring 18. However, the one-way clutch 16 will compel the turntable to rotate the disk 92 when the drum 14 is driven by the unwinding spring 18, i.e., while the spring dissipates energy which has been stored during winding. As the spring 18 unwinds, it causes the reel 22 to take up the cord 130 so that the latter is nearly fully convoluted at the time the reproduction of the sound is completed. The convolutions of the cord 130 on the core of the reel 22 are not shown in the drawings.

The sound grooves which are provided in the exposed side of the disk 92 may be tracked by a stylus or needle 94a of a stylus carrier 94 which, for convenience, will be called tone arm. The tone arm 94 has an outer end portion or hub 108 (see FIG. 3) which is rotatable about the axis of a pivot 104 mounted on the base 90 adjacent to the disk 92. When the stylus 94a tracks a selected sound groove, the tone arm 94 transmits vibrations to a loudspeaker diaphragm 97 which is accommodated in the cover 90a and whose open side is adjacent to the perforated top wall 90a' of the cover, see FIG. 2. The heretofore described elements of the phonograph by themselves form no part of the present invention and, save for the specific configuration and mounting of the tone arm 94, are disclosed in the copending application Serial No. 297,798 of Anton Ashmele.

Since the exposed side of the disk 92 is provided with several independent concentric helical sound grooves, the phonograph must be equipped with a stop device which enables the tone arm 94 to move its stylus 94a into registry with the outer convolution of any selected sound groove so that the diaphragm 97 will emit a certain sound or a certain sequence of sounds. Also, whenever the stylus 94a reaches the inner convolution of a selected groove, it must be returned to a new starting position without scratching the exposed side of the disk 92, i.e., the stylus 94a must be separated from the disc, the two parts carrying out a motion relative to each other in approximately axial direction, whereupon the opposite motion takes place with renewed engagement of the parts at the time the stylus is in exact registry with the outer convolution of a newly selected sound groove. In this connection reference is made to the constructions as shown in the U.S. Patents Nos. 1,979,067 and 3,017,187 in the name of B. S. Franklin and I. W. Ryan respectively. The outer convolution of each sound groove is located at a different distance from the shaft 92a, i.e., at a different distance from the periphery of the disk 92. As a rule, the phonograph is constructed in such a way that the stylus 94a should track the sound grooves in a predetermined sequence and, therefore, the phonograph comprises an adjustable stop device 102 whose construction forms an important part of the present invention. This stop device determines the starting position of the tone arm 94 and thereby controls the initial position of the stylus 94a with reference to the disk 92. The main purpose of the stop device 102 is to determine the exact distance between the tip of the stylus 94a and the axis or the periphery of the disk 92 at the time the tone arm 94 has been moved to its starting position because, once such starting position is selected with sufficient accuracy, the stylus 94a will automatically track a selected sound groove as soon as the disk begins to rotate whereby the stylus entrains the tone arm toward the shaft 92a and comes to a halt upon reaching the inner convolution of the corresponding sound groove. In the illustrated embodiment, the construction of the stop device 102 is such that the latter may be automatically adjusted by the non-convoluted portion 130b of the cord 130 when the cord is pulled for the purpose of tensioning the spring 18.

The stylus 94a is mounted on the head 96 of the tone arm 94, and this head is provided with a vibration transmitting element which cooperates with the diaphragm 97. The tone arm 94 further comprises an extension or prong 98 which projects beyond the head 96 and is provided with an arcuate follower 100. The follower 100 cooperates with the stop device 102. It was found that the length of the prong 98 should preferably approximate the length of the remainder of the tone arm 94, i.e., the distance between the head 96 and the pivot 104. The stop device 102 comprises a rotary selector 106 which is tracked by the follower 100 and which thereby compels the stylus 94a to come to a halt in a preselected starting position. The hub 108 of the tone arm 94 surrounds the pivot 104, and an end portion 110 of the pivot extends beyond the hub 108 to carry a slide 112 which is reciprocable in a guide 114. The slide 112 is reciprocable in the axial direction of the pivot 104. The guide 114 carries an adjustable regulator screw 116 whose inner end portion abuts against the slide 112 to oppose the bias of a helical torsion spring 118 which tends to move the hub 108 upwardly, as viewed in FIG. 3. This spring 118 is installed between an annular shoulder of the pivot 104 and the underside of the hub 108. The guide 114 comprises legs 114a which are anchored in the base 90. The screw 116 serves to regulate the pressure with which the tip of the stylus 94a bears against the exposed side of the disk 92. The spring 118 also serves as a return spring to move the tone arm 94 back to the starting position. As shown, one terminal 120 of the spring 118 is arranged to abut against a projection 90e of the base 90 and the other terminal 122 of the spring 118 straddles the tone arm 94 so that the tone arm is biased in a counterclockwise direction, as viewed in FIG. 1. In other words, the spring 118 tends to lift the stylus 94a off the exposed side of the disk 92 and simultaneously attempts to maintain the follower 100 in abutment with the selector 106 of the stop device 102.

The stop device 102 comprises a main supporting member or column 124 which is rigid with the bottom wall of the base 90 and which supports a shaft 126 of the selector 106. This selector comprises a specially configurated plate-like arresting member 128 whose periphery serves as a stop for the follower 100 of the prong 98. The arresting member 128 may be rotated by the cord 130 through the intermediary of a one-way clutch including a ratchet wheel 132 which is fixed to the shaft 126. The periphery of the arresting member 128 is stepped or toothed to form a series of stop faces 133 each of which is located at a different distance from the axis of the shaft 126. The number of stop faces 133 corresponds to the number of independent sound grooves in the exposed side of the disk 92. The driving connection between the cord 130 and the arresting member 128 is such that the arresting member is invariably turned through a predetermined angle when the cord is pulled in order to rewind the spring 18. In response to each pull upon the cord, the shaft 126 will rotate the arresting member 128 in a sense to move a different stop face 133 into the path of the follower 100.

The ratchet wheel 132 cooperates with an advancing pawl 134, and the angular distance between the radial faces of consecutive teeth on the ratchet wheel 132 is the same as the angular distance which must be covered by the selector 106 to move a fresh stop face 133 into the path of the follower 100. The advancing pawl 134 is secured to one end of a motion transmitting rod 142 which is reciprocable in aligned guides 136, 138, 140 provided on the bottom wall of the base 90. The connection between the rod 142 and the advancing pawl 134 is such that the latter is free to pivot about a pin **134*a*. As best shown in FIG. 2, the rod 142 is provided with a bore 143 for the non-convoluted portion 130*b* of the cord 130, and the position of the bore 143 with reference to the periphery of the reel 22 and the aperture 90*f* in the base 90 is such that the non-convoluted portion 130*b* is deflected from a straight line. In other words, the bore 143 is spaced from a straight line which connects the periphery of the reel 22 with the aperture 90*f*. Therefore, when the operator grasps the eye 130*a* and pulls the cord 130 in a sense to rewind the spring 18, the rod 142 will be shifted in the direction indicated by an arrow 142*a* and the advancing pawl 134 will automatically turn the ratchet wheel 132 through an angle which suffices to move another stop face 133 into the path of the follower 100. When the eye 130*a* is released, the rod 142 automatically returns to the starting position of FIG. 1 in response to the bias of a torsion spring 146 which is convoluted around a stud 144 and comprises two terminals 148, 152. The terminal 148 abuts against a first stop pin 150 of the base 90 and the terminal 152 abuts against a second stop pin 154 provided at the rear end of the rod 142**.

In order to prevent uncontrolled angular displacements of the arresting member 128, the stop device 102 comprises a blocking pawl 158 which is pivotable about a pin 156 secured to the bottom wall of the base 90 and which engages the ratchet wheel 132 in such a way that the latter is held against rotation in a counterclockwise direction, as viewed in FIG. 1. The pawls 134, 158 are connected to each other by a helical spring 162 which allows the pallet 160 of the blocking pawl 158 to ride over a tooth of the ratchet wheel when the latter is rotated by the advancing pawl 134, i.e., when the rod 142 performs a working stroke in response to a pull upon and resultant stretching of the cord 130.

The cord 130 also serves to separate stylus **94*a* and disk 92 when the stylus is located in the innermost convolution of a selected sound groove and when the operator exerts a pull on the eye 130*a* in order to rewind the spring 18. To this end either the disc is lowered or tipped off so as to separate the disc from the stylus or the stylus may be lifted off the disc with both separating motions being effected by exerting a pull on the cord 130** by the user.

Figure 2:
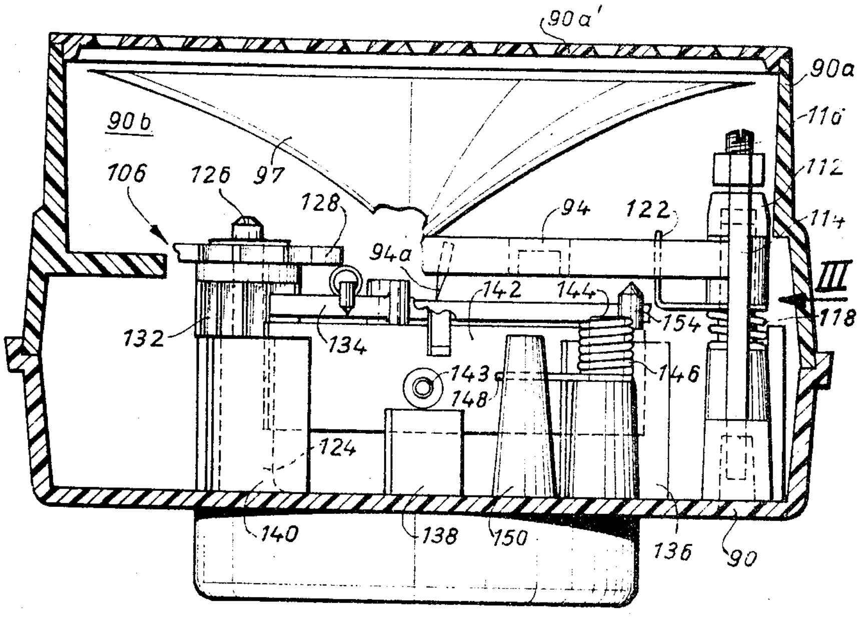
FIG. 2 is a transverse section substantially as seen in the direction of arrows from the line II—II of FIG. 1.
Figure 3:
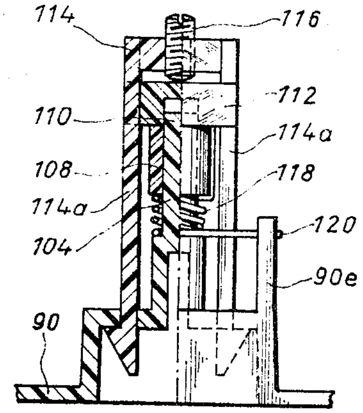
FIG. 3 is an end elevational view of the mounting for the tone arm substantially as seen in the direction of arrow III in FIG. 1, with certain parts shown in section.

The phonograph of FIGS. 1 and 2 is operated as follows: In FIG. 1, the phonograph is shown in idle position because the spring 18 has dissipated its energy and cannot rotate the disk 92. The eye **130*a* is assumed to be held by a finger and the finger exerts a pull in a direction to withdraw the non-convoluted portion 130*b* of the cord 130 from the housing, i.e., through the aperture 90*f*. Therefore, the cord 130 is under tension and engages the extension 98 to lift the stylus 94*a* off the exposed side of the disk 92 whereby the torsion spring 118 automatically returns the tone arm 94 to the position of FIG. 1 in which the follower 100 abuts against the arresting member. As the user exerts a pull on the cord 130, the latter begins to wind the spring 18 and simultaneously shifts the rod 142 in the direction indicated by the arrow 142*a* so that the advancing pawl 134 turns the ratchet wheel 132 and the ratchet wheel turns the arresting member 128 in order to move a fresh stop face 133 into the path of the follower 100. Such angular displacement of the arresting member 128 will take place before or after the follower 100 reaches the position of FIG. 1, but always before the cord 130 completes the winding of the spring 18. Once the operator releases the eye 130*a*, the cord slackens and the spring 146 is free to retract the rod 142 to the position of FIG. 1. Also, when the eye 130*a* is released, the cord yields to the pressure of the slightly deformed tone arm 94 and allows the tip of the stylus 94*a*, to descend into the outer convolution of a freshly selected sound groove on the exposed side of the disk. Furthermore, and also in response to release of the eye 130*a*, the spring 18 is free to unwind and will rotate the disk 92 whereby the stylus tracks the selected sound groove and advances toward the shaft 92*a* to come to a rest in the inner convolution of the groove. The stylus then remains in such position until the operator decides to grasp the eye 130*a* in order to rewind the spring 18. Of course, when the operator pulls the eye 130*a*, the cord again effects a separation of stylus and disc and the cord compels the rod 142 to perform a working stroke in order to turn the arresting member 128 into a new angular position. It will be noted that the tip of the follower 100 is provided with an inclined cam face 101 which enables the arresting member 128 to rotate even if the follower abuts against its periphery. It is further to be noted that a portion of the arresting member 128** is broken away in FIG. 1.

The follower 100 cooperates with the arresting member 128 to stop the stylus **94*a* in an accurately selected position with reference to the disk 92 so that the stylus may descend into the outer convolution of a desired sound groove when the eye 130*a* is released. Even if, for some unforeseen reason, the ratchet wheel 132 comes to a halt in an intermediate position in which its teeth are not engaged by the pallets of the pawls 134, 158, the stylus 94*a* is kept in accurate alignment with the outer convolution of a sound groove because the spring 118 keeps the follower 100 in abutment with the arresting member 128. It is also clear that the distribution of teeth on the ratchet wheel 132 may be such that the follower will consecutively engage alternate stop faces 133 or each third stop face. The fact that the follower 100 invariably holds the tone arm 94 in a position in which the stylus is in registry with the outer convolution of a sound groove is of importance when the phonograph is installed in a toy device. Thus, the toy device may be subjected to rough treatment and it could happen that the arresting member 128 "jumps" so that the follower 100 will skip a stop face 133**. This will not affect the operation of the phonograph because its mechanism will then simply reproduce the next sound or the next series of sounds when the stylus is allowed to track the corresponding sound groove.

It is further clear that the shaft 126 of the stop device 102 may be extended to project beyond the bottom wall of the base 90 and that such extension of the shaft 126 may be provided with a knob or the like so that the arresting member 128 can be rotated by hand. In such simplified stop devices, the motion transmitting rod 142 may be omitted because the operator will then adjust the angular position of the arresting member 128 whenever he decides to reproduce a different series of sounds. Of course, such manually operable knob may be provided in addition to the structure shown in FIGS. 1 to 3 so that the arresting member 128 may be rotated by hand if the motion transmitting rod 142 or the parts connected and cooperating therewith happen to be out of order. The manner in which a stop device may be provided with a manually operable knob is disclosed in the aforementioned patent application Serial No. 297,798.

Without further analysis, the foregoing will so fully reveal the gist of the present invention that others can, by applying current knowledge, readily adapt it for various applications without omitting features which fairly constitute the essential characteristics of the generic and specific aspects of this invention and, therefore, such adaptations should and are intended to be comprehended within the meaning and range of equivalence of the following claims.

What is claimed as new and desired to be secured by Letters Patent is:

1. In a sound reproducing apparatus, a rotary disk having an exposed side provided with a series of independent concentric helical sound grooves each having an outer convolution and an inner convolution respectively located at a first and second distance from the periphery of said disk; a rewindable spring for rotating said disk; a device for winding said spring including a flexible element which is stretched when the spring is held against unwinding and which is slack when the spring unwinds to rotate said disk; a tone arm including a stylus overlying said disk and being movable with the stylus between a series of starting and second positions respectively located at a first and second distance from the periphery of said disk, said stylus being aligned with the outer convolution of a different sound groove in each starting position and with the inner convolution of the respective sound groove in each second position of said tone arm, said stylus normally engaging said disk to track a sound groove when the disk rotates and said tone arm being arranged to separate stylus and disk in responds to stretching of said flexible element; means for returning the tone arm to one of said starting positions when the stylus is disengaged from said disk; and stop means for arresting the tone arm in one of said starting positions, comprising a rotary arresting member having a plurality of stop faces each disposed at a different distance from the axis of said arresting member, said stop faces being movable into the path of said tone arm to arrest the stylus in different starting positions, and motion transmitting means operatively connected with said flexible element for rotating said arresting member and comprising a reciprocable member arranged to move in a direction to rotate said arresting member in response to stretching of said flexible element.

2. A structure as set forth in claim 1, wherein the number of said stop faces equals the number of independent sound grooves in said disk.

3. In a sound reproducing apparatus, a rotary disk having an exposed side provided with a series of independent concentric helical sound grooves each having an outer convolution and an inner convolution respectively located at a first and second distance from the periphery of said disk; a rewindable spring for rotating said disk; a device for winding said spring including a flexible element which is stretched when the spring is held against unwinding and which is slack when the spring unwinds to rotate said disk; a tone arm including a stylus overlying said disk and being movable with the stylus between a series of starting and second positions respectively located at a first and second distance from the periphery of said disk, said stylus being aligned with the outer convolution of a different sound groove in each starting position and with the inner convolution of the respective sound groove in each second position of said tone arm, said stylus normally engaging said disk to track a sound groove when the disk rotates and said tone arm being arranged to separate stylus and disk in response to stretching of said flexible element; means for returning the tone arm to one of said starting positions when the stylus is disengaged from said disk; and stop means for arresting the tone arm in one of said starting positions, comprising a rotary arresting member having a plurality of peripheral stop faces each disposed at a different distance from the axis of said arresting member, said stop faces being located in the path of said tone arm to arrest the stylus in different starting positions, a ratchet wheel fixed to said arresting member, and motion transmitting means operatively connected with said flexible element for rotating said ratchet wheel, said motion transmitting means comprising a reciprocable member arranged to perform a working stroke in a direction toward said ratchet wheel in response to stretching of said flexible element and an advancing pawl secured to said reciprocable member and arranged to rotate said ratchet wheel and said arresting member through a predetermined angle when said reciprocable member performs a working stroke whereby said arresting member moves a different stop face into the path of said tone arm in response to each rewinding of said spring.

4. A structure as set forth in claim 3, wherein said advancing pawl is pivotable with reference to said reciprocable member and further comprising resilient means for biasing said pawl against said ratchet wheel.

5. A structure as set forth in claim 4, wherein said advancing pawl is pivotable with reference to said reciprocable member and further comprising a blocking pawl arranged to oppose rotation of said ratchet wheel in a direction counter to the direction in which the ratchet wheel is rotated by said advancing pawl, and resilient means for biasing said pawls against said ratchet wheel.

6. A structure as set forth in claim 5, wherein said resilient means comprises a helical spring which connects said pawls to each other and further comprising pivot means rotatably supporting said blocking pawl.

7. In a sound reproducing apparatus, a rotary disk having an exposed side provided with a series of independent concentric helical sound grooves each including an outer convolution and an inner convolution respectively located at a first and second distance from the periphery of said disk; a rewindable spring for rotating said disk; a device for winding said spring including a flexible element which is stretched when the spring is held against unwinding and which is slack when the spring unwinds to rotate said disk; an elongated tone arm including a stylus overlying said disk and being rockable with the stylus between a series of starting and second positions respectively located at a first and second distance from the periphery of said disk, said stylus being located intermediate the ends of said tone arm and being aligned with the outer convolution of a different sound groove in each starting position and with the inner convolution of the respective sound groove in each second position of said tone arm, said stylus normally engaging said disk to track a sound groove when the disk rotates and said tone arm including the stylus being separated from the disk in response to stretching of said flexible element; pivot means rotatably supporting one end of said tone arm; means for returning the tone arm to one of said starting positions when the stylus is disengaged from said disk; and stop means for arresting the tone arm in one of said starting positions, comprising a rotary arresting member having a plurality of peripheral stop faces each disposed at a different distance from the axis of said arresting member, said stop faces being located in the path of the other end of said tone arm to arrest the stylus in different starting positions, and motion transmitting means operatively connected with said flexible element for rotating said arresting member, said motion transmitting means comprising a reciprocable member arranged to move in a direction to rotate said arresting member in response to stretching of said flexible element.

8. A structure as set forth in claim 7, wherein the second end of said tone arm comprises a follower which engages a different stop face on said arresting member in each starting position of said tone arm.

9. A structure as set forth in claim 7, wherein said one end of the tone arm is movable axially of said pivot means and further comprising resilient means for biasing said one end in a direction to move the stylus away from the exposed side of said disk, and adjustable regulator means for opposing the bias of said resilient means.

10. A structure as set forth in claim 9, wherein said one end of the tone arm comprises a hub which surrounds said pivot means and further comprising a slide axially movably mounted on said pivot means and engaging said hub, and a fixed guide for said slide, said resilient means comprising a spring member arranged to bias said hub against said slide and said regulator means comprising a screw meshing with said guide and extending into the path of said slide.

11. A structure as set forth in claim 10, wherein said spring member constitutes said means for returning the tone arm to one of said starting positions.

12. In a sound reproducing apparatus, a rotary disk having an exposed side provided with a series of independent concentric helical sound grooves each having an outer convolution and an inner convolution respectively located at a first and second distance from the periphery of said disk; a rewindable spring for rotating said disk; a device for winding said spring including a flexible element which is stretched when the spring is held against unwinding and which is slack when the spring unwinds to rotate said disk; a tone arm including a stylus overlying said disk and being movable with the stylus between a series of starting and second positions respectively located at a first and second distance from the periphery of said disk, said stylus being aligned with the outer convolution of a different sound groove in each starting position and with the inner convolution of the respective sound groove in each second position of said tone arm, said stylus normally engaging said disk to track a sound groove when the disk rotates and said tone arm including the stylus being separated from the disk in response to stretching of said flexible element; means for returning the tone arm to one of said starting positions when the stylus is disengaged from said disk; and stop means for arresting the tone arm in one of said starting positions, comprising a rotary arresting member having a plurality of peripheral stop faces each disposed at a different distance from the axis of said arresting member, said stop faces being movable into the path of said tone arm to arrest the stylus in different starting positions, and motion transmitting means operatively connected with said flexible element for rotating said arresting member and comprising a reciprocable rod arranged to move in a direction to rotate said arresting member in response to stretching of said flexible element, resilient means for biasing the rod in opposite direction, and fixed guide means for said rod.

13. A structure as set forth in claim 12, wherein said rod is provided with a bore for a portion of said flexible element and wherein said flexible element is deformed by said rod when the rod is free to follow the bias of said resilient means.

14. In a sound reproducing apparatus, a rotary disk having an exposed side provided with a series of independent concentric helical sound grooves each having an outer convolution and an inner convolution respectively located at a first and second distance from the periphery of said disk; a rewindable spring for rotating said disk; a device for winding said spring including a flexible element which is stretched when the spring is held against unwinding and which is slack when the spring unwinds to rotate said disk; a tone arm including a stylus overlying said disk and being movable with the stylus between a series of starting and second positions respectively located at a first and second distance from the periphery of said disk, said stylus being aligned with the outer convolution of a different sound groove in each starting position and with the inner convolution of the respective sound groove in each second position of said tone arm, said stylus normally engaging said disk to track a sound groove when the disk rotates and said tone arm being arranged to separate the stylus and disk in response to stretching of said flexible element; means for returning the tone arm to one of said starting positions when the stylus is disengaged from said disk; adjustable stop means for arresting said tone arm in one of said starting positions, said stop means including an arresting member movable between a plurality of positions corresponding to different starting positions of the stylus and motion transmitting means operatively connected with said flexible element for moving said arresting member from one of said plurality of positions into another of said plurality of positions thereof in response to stretching of said flexible element.

References Cited by the Examiner

UNITED STATES PATENTS

| | | | |
|---|---|---|---|
| 3,017,187 | 1/1962 | Ryan | 274—14 |
| 3,168,318 | 2/1965 | Lea | 274—23 X |

FOREIGN PATENTS

| | | |
|---|---|---|
| 970,009 | 9/1964 | Germany. |

NORTON ANSHER, *Primary Examiner.*

EVON C. BLUNK, *Examiner.*

CLIFFORD B. PRICE, *Assistant Examiner.*